(12) United States Patent
Seats

(10) Patent No.: US 10,255,222 B2
(45) Date of Patent: Apr. 9, 2019

(54) SYSTEM AND METHOD FOR WIRELESSLY TRANSMITTING DATA FROM A HOST DIGITAL DEVICE TO AN EXTERNAL DIGITAL LOCATION

(71) Applicant: Dover Electronics LLC, Dover, OH (US)

(72) Inventor: Dylan T. Seats, Dover, OH (US)

(73) Assignee: DOVER ELECTRONICS LLC, Dover, OH (US)

( * ) Notice: Subject to any disclaimer, the term of this patent is extended or adjusted under 35 U.S.C. 154(b) by 120 days.

(21) Appl. No.: 15/358,328

(22) Filed: Nov. 22, 2016

(65) Prior Publication Data
US 2018/0143933 A1  May 24, 2018

(51) Int. Cl.
*G06F 13/00* (2006.01)
*G06F 13/40* (2006.01)
*H04B 7/24* (2006.01)

(52) U.S. Cl.
CPC ...... *G06F 13/4068* (2013.01); *G06F 13/4022* (2013.01); *H04B 7/24* (2013.01)

(58) Field of Classification Search
CPC .... G06F 13/4068; G06F 13/4022; H04B 7/24
See application file for complete search history.

(56) References Cited

U.S. PATENT DOCUMENTS

| | | | |
|---|---|---|---|
| 6,750,902 B1 * | 6/2004 | Steinberg | G03B 7/091 348/207.1 |
| 6,978,023 B2 | 12/2005 | Dacosta | |
| 7,561,539 B2 | 7/2009 | Sugaya | |
| 7,581,970 B2 | 9/2009 | Englund | |
| 7,586,460 B2 | 9/2009 | Hunt et al. | |
| 7,680,490 B2 | 3/2010 | Bloebaum et al. | |
| 7,764,794 B2 | 7/2010 | Dacosta | |

(Continued)

FOREIGN PATENT DOCUMENTS

| | | |
|---|---|---|
| CN | 101529886 A | 9/2009 |
| CN | 101553793 A | 10/2009 |

(Continued)

OTHER PUBLICATIONS

"Moultrie Mobile Wireless Field Modem MV1 (Field Review)" by Rich W., 2016.*

(Continued)

*Primary Examiner* — Jing-Yih Shyu
(74) *Attorney, Agent, or Firm* — Standley Law Group LLP; Jeffrey Norris; Adam Smith

(57) ABSTRACT

Systems and methods for sending files or other data wirelessly from a host digital device to an external digital location by, for example, utilizing the host device's existing media card slot. One embodiment of a system and method is able to connect to a host digital device by using a media card connection cable that may comprise a pseudo media card and a connection cable. The cable is connected to a processing circuit. In an exemplary embodiment, the processing circuit may share the use of at least one media card that may store data from the host device. An exemplary embodiment of the processing circuit may be in electrical communication with at least one wireless source such that the at least one wireless source is adapted to transmit an image or other data to a desired external location or locations.

24 Claims, 9 Drawing Sheets

(56) References Cited

U.S. PATENT DOCUMENTS

| | | | |
|---|---|---|---|
| 7,908,258 B2 | 3/2011 | Kudo et al. | |
| 7,914,310 B2 | 3/2011 | Johansson et al. | |
| 7,933,273 B2 | 4/2011 | Takeda et al. | |
| 7,948,246 B2 | 5/2011 | Agevik et al. | |
| 7,983,677 B2 | 7/2011 | Dacosta | |
| 8,199,682 B2 | 6/2012 | Sugaya | |
| 8,346,939 B2 | 1/2013 | Tomita | |
| 8,508,598 B2 | 8/2013 | Louks et al. | |
| 8,565,190 B2 | 10/2013 | Takeda et al. | |
| 8,589,990 B2 | 11/2013 | Dashevskiy et al. | |
| 8,989,170 B2 | 3/2015 | Sugaya | |
| 9,179,461 B2 | 11/2015 | Sugaya | |
| 9,215,709 B2 | 12/2015 | Sugaya | |
| 2002/0101533 A1* | 8/2002 | Liu | H04N 5/2251 348/375 |
| 2005/0221834 A1* | 10/2005 | Kangas | H04W 28/18 455/452.1 |
| 2008/0100718 A1 | 5/2008 | Louks et al. | |
| 2008/0101272 A1* | 5/2008 | Hayes | G06F 13/385 370/313 |
| 2008/0102765 A1 | 5/2008 | Louks et al. | |
| 2008/0102892 A1* | 5/2008 | Louks | H04N 1/00132 455/557 |
| 2008/0170130 A1* | 7/2008 | Ollila | H04N 5/2252 348/211.99 |
| 2008/0183927 A1* | 7/2008 | Rofougaran | G06F 13/4022 710/106 |
| 2010/0159831 A1* | 6/2010 | Matsushima | G03B 7/00 455/41.2 |
| 2011/0176008 A1* | 7/2011 | Fujitani | H04N 1/00236 348/207.1 |
| 2012/0206565 A1* | 8/2012 | Villmer | H04N 1/00 348/36 |
| 2013/0120570 A1 | 5/2013 | Stanley et al. | |

FOREIGN PATENT DOCUMENTS

| | | | | |
|---|---|---|---|---|
| CN | 101573957 A | | 11/2009 | |
| CN | 103108217 A | | 5/2013 | |
| CN | 101573957 B | | 10/2013 | |
| CN | 203769395 U | * | 8/2014 | |
| CN | 105516423 A | * | 4/2016 | H04M 1/21 |
| EP | 2080101 A2 | | 7/2009 | |
| EP | 2080357 A1 | | 7/2009 | |
| EP | 2090091 B1 | | 7/2010 | |
| EP | 2080101 B1 | | 3/2013 | |
| GB | 2496414 A | | 5/2013 | |
| JP | 2010508712 A | | 3/2010 | |
| WO | 2008054896 A2 | | 5/2008 | |
| WO | 2008054897 A1 | | 5/2008 | |
| WO | 2008054898 A1 | | 5/2008 | |
| WO | 2008054899 A2 | | 5/2008 | |
| WO | 2008054899 A3 | | 6/2008 | |

OTHER PUBLICATIONS

Amazon, https://www.amazon.com/Moultrie-Mobile-Wireless-Field-Modern/dp/B01JTUBZG4/ref=sr_1_1/156-9314147-3554954?ie=UTF8&qid=1485392802&sr=8-1&keywords=moultrie+mv1, accesses Online Feb. 28, 2017, pp. 1-8, USA.

\* cited by examiner

SYSTEM AND METHOD FOR WIRELESSLY TRANSMITTING DATA FROM A HOST DIGITAL DEVICE TO AN EXTERNAL DIGITAL LOCATION

BACKGROUND AND SUMMARY OF THE INVENTION

Exemplary embodiments of the present invention relate generally to digital devices, such as digital cameras, and related systems and methods for sending files or other data wirelessly from a host digital device to an external digital location by, for example, utilizing the host device's existing media card slot.

Devices such as digital still cameras ("DSCs") often rely on removable, non-volatile media cards to store image and other data (e.g., metadata concerning the image data). Other digital media devices such as audio/video recorders/players (e.g., mobile phones, personal digital assistants, MP3 players, digital video cameras, trail cameras, etc.) also use such media cards to store a variety of digital media (e.g., images, movies, audio, etc.). Several media card formats exist, including Secure Digital (SD) cards, Multi Media Cards (MMC), Compact Flash (CF) I and II cards, Memory Sticks (MS), and xD Picture (xD) cards. As used herein, the term media card is intended to refer to all such digital media storage devices, regardless of physical format.

Commonly, in order to extract images or other data from these media cards, a tethered serial connection (such as USB) to a personal computer (or similar device) is required, or the card must be removed and inserted into a personal computer (or similar device). For example, images can be uploaded to personal computers via card readers or wired connections between the cameras hosting the media cards and the personal computers.

More recently, digital cameras having wireless network connectivity have become available. These cameras permit connectivity with wireless networks (usually such networks are compliant with IEEE 802.11 a/b/g/n standards) to transfer the data from the media card to an external digital location such as a personal computer. However, such cameras are typically more expensive than non-wireless network capable DSCs.

In addition, companies such as Eye-FI, Toshiba, and others are producing media cards that have wireless network connectivity. As used herein, the term wireless media card is intended to refer to all such media cards that have wireless connectivity, regardless of manufacturer. However, wireless media cards generally have limited range as compared to commercially available wireless routers and other wireless technologies such as XBee and ZigBee that use low frequency RF to cover longer distances. In addition, wireless media cards consume power from the host device in order to transmit/receive data. This power consumption causes the host device to have a shortened battery life as compared to a host device using a non-wireless media card. These disadvantages are difficult to overcome because the manufacturer is limited to the space allotted to a media card slot on the host device. Without extra space, longer range wireless technologies and battery packs cannot be included in a typical wireless media card design.

In view of the shortcomings of the known art, there is a need for a system and method for transferring images and other data from a digital device to an external location that does not require a hard-wired connection to the external location. There is also a need for a system and method for transferring images or other data from a digital device that does not require removal of the media card from the digital device. In addition, there is a need for a system and method for transferring images and other data from a digital device that is not subject to or otherwise improves upon the aforementioned limitations of known wireless technologies.

An exemplary embodiment of the present invention may address one or more of the aforementioned needs. In an exemplary embodiment, a system and method of the present invention is able to connect to a host digital device by using a media card connection cable that may comprise a pseudo media card and a connection cable. The cable is connected to a processing circuit. In an exemplary embodiment, the processing circuit may share the use of at least one media card that may store data from the host device. An exemplary embodiment of the processing circuit may be in electrical communication with at least one wireless source such that the at least one wireless source is adapted to transmit an image or other data to a desired external location or locations. Furthermore, in an exemplary embodiment, the processing circuit may be housed in a case that is also large enough to house a power circuit and the at least one wireless source. An example of the power circuit may include at least one battery such that the system is adapted to overcome the aforementioned current/power limitations in the known market. Furthermore, an exemplary embodiment of the at least one wireless source may have a longer range than the aforementioned known wireless technologies. For example, an embodiment of the at least one wireless source may be in association with a cellular and/or web network.

In an exemplary embodiment, a user may be able to use an intuitive setup sequence to program the system to send files from the host device to any number of external digital locations including, but not limited to, e-mail, mobile phone, personal computer, remote storage device, or any other locations. Additionally, in an exemplary embodiment, a transmission sequence may be such that data is never lost if a transmission fails. Instead, the file or other data may be located on at least one media card at least until a transmission is successful. Furthermore, an example of a power circuit may be designed so that the battery life is not expended when the unit is not transmitting files from the host device. An exemplary embodiment may also include a novel arrangement of at least one switch (e.g., transistors, MOSFETs, bus switches, digital switches, integrated circuit switches, microprocessors, etc.) in the processing circuit that allows for efficient sharing of the at least one media card between the host device and the processing circuit to facilitate the transfer of image or other data.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Exemplary embodiments of the present invention are directed to systems and methods for sending files or other data wirelessly from a host device to an external location or locations by, for example, interfacing with the host device's existing media card slot and sharing a media card or other storage device with the host device. However, unless otherwise specified, exemplary embodiments may interface with a host device in any other suitable manner that allows for transfer of data from the host device to a media card or other storage device.

Figure 1:
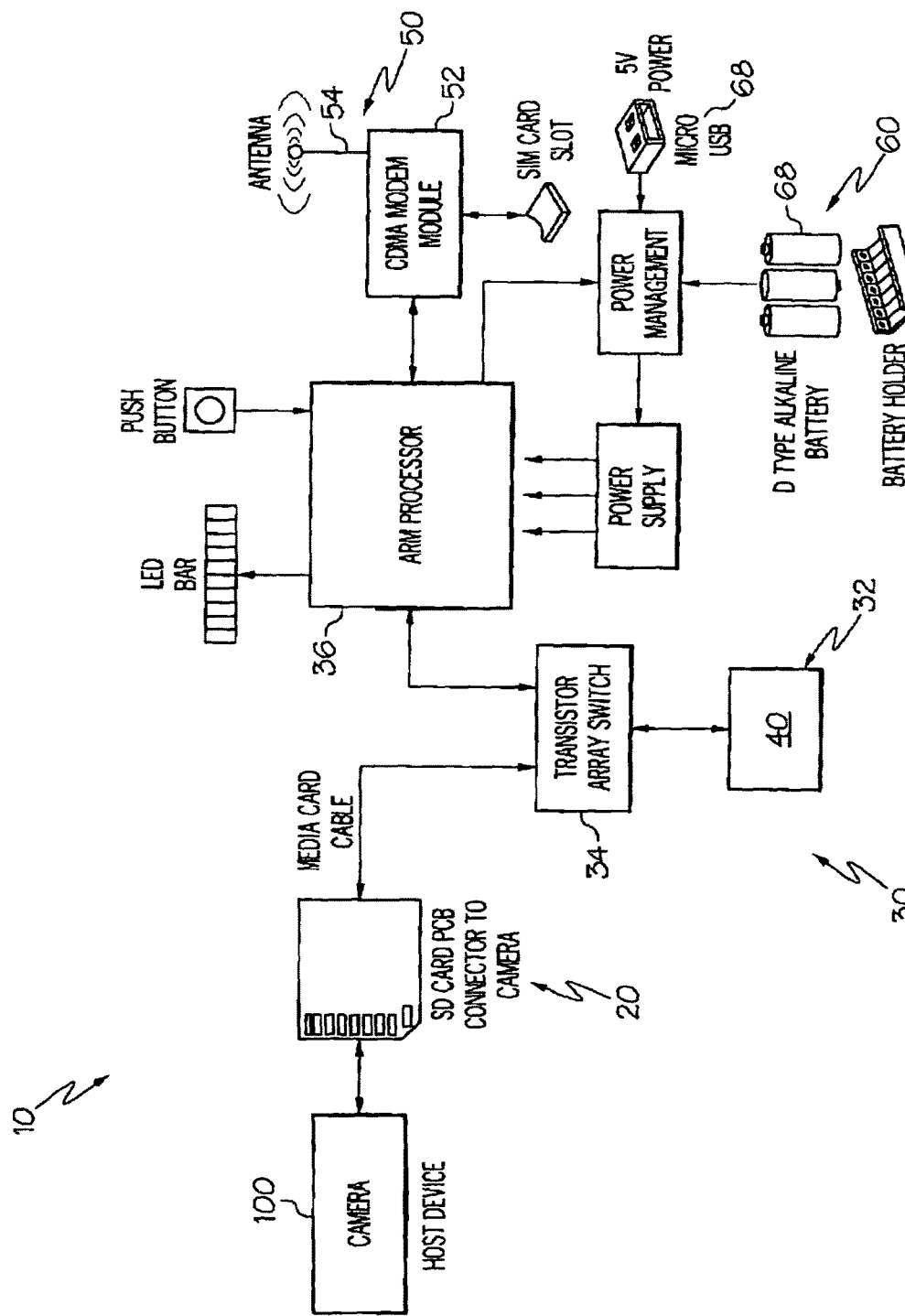
FIG. 1 is a schematic diagram of an exemplary embodiment of a system of the present invention.

FIG. 1 shows one exemplary embodiment of a system 10 for transmitting data from a host device 100 (e.g., a digital camera) to an external location. System 10 may comprise a media card connection cable 20 that is adapted to be connected to host device 100. An exemplary system may also include a processing circuit 30 that comprises a media card socket or receptacle 32. Such as shown in this example, processing circuit 30 may also comprise at least one switch 34 (e.g., transistors, MOSFETs, bus switches, digital switches, integrated circuit switches, microprocessors, etc.) and at least one microprocessor or similar computing device 36 (e.g., microcontrollers, Advanced RISC Machine (ARM) processors, etc.). FIG. 1 shows an example utilizing at least one transistor switch array. However, any other type of at least one switch may be substituted for the transistor switch array in FIG. 1. A media card 40 (e.g., a SD card, a MMC, etc.) is positioned in the media card socket. As a result, the media card 40 is adapted to store data or other files that may be received from the host device 100. Other exemplary embodiments may utilize other suitable types of storage, and the system may include other suitable means of connection to such other storage devices. For ease of reference, any such other storage devices are referred to as media cards herein. At least one wireless source 50 (e.g., a Code Division Multiple Access (CDMA) wireless module 52 that comprises antenna 54) is in electrical communication with the processing circuit 30 such that the at least one wireless source 50 is configured to transmit data that is stored on the media card 40. In addition, a power circuit 60 may provide power to system 10.

An exemplary embodiment of a system 10 may be configured such that the processing circuit and the host device are not allowed to read or write to or from the at least one media card 40 at the same time. For example, in a first state of one exemplary embodiment, a media card 40 is configured to store data transmitted by said host device 100 through said media card connection cable 20; and in a second state, the processing circuit 30 is configured to disconnect the media card 40 from electrical communication with the host device 100 such that the at least one wireless source 50 is enabled to transmit data that is stored on media card 40. Such as in this manner, an exemplary embodiment may allow processing circuit 30 and host device 100 to share a media card 40. However, other exemplary embodiments may utilize other types of storage devices (which may not currently exist) that may enable concurrent use of a media card by a processing circuit and a host device.

To further illustrate an exemplary embodiment of system 10, examples of a setup sequence, a media card connection cable 20, a processing circuit 30, a transmission sequence of a wireless source 50, and a power circuit 60 will be described in more detail.

An exemplary setup sequence may utilize a graphical user interface (GUI), a setup button, and/or a broadcast button. An example of a setup button and/or a broadcast button is generally shown as a "push button" in FIG. 1. An example of an interface GUI is a screen that allows the user to change settings for the processing circuit 30 and for a transmission sequence for the wireless source 50. For instance, a GUI may be accessed by typing in the processing circuit's IP address after inserting an Ethernet cable into the processing circuit 30 or after connecting to the processing circuit 30 via an Ad-hoc network created by the processing circuit 30. Within an exemplary GUI, changes to the processing circuit 30 and the transmission sequence settings of wireless source 50 may be made. For example, settings may be set such as the network location(s) to which the files or other data should be transferred, the e-mail address(es) to which the files or other data should be transferred, the TC/IP settings of the wireless module 52, the output conversion size of any picture files or other data, whether files or other data are to be sent to a network location or e-mail address, whether files or other data are to be deleted after transmission, Wi-Fi connection settings, and network location security settings.

An example of a setup button may allow a user to place the processing circuit 30 into a setup mode. In one exemplary embodiment of system 10, processing circuit 30 may stay powered on continuously while the processing circuit 30 is in setup mode. An embodiment of processing circuit 30 may normally turn off after it is done transmitting files and after a predetermined amount of time. This may be done so that system 10 conserves power. However, while in setup mode, an example of processing circuit 30 may not turn off in order to allow a user to connect to processing circuit 30 via an Ethernet cable or an Ad-hoc network, for example.

An example of a broadcast button may cause processing circuit 30 to broadcast a radio signal in order to supply a "wake up" signal to power on a separate device (e.g., a Network-Attached Storage (NAS) device). An example of this radio signal may be on any number of wavelengths. In one such embodiment, the broadcast signal may utilize the at least one wireless source 50 (e.g., a Wi-Fi transceiver) used by the transmission sequence for broadcasting a 2.4 GHz signal. For longer range, an example of the broadcast signal may use a small wavelength transceiver that utilizes 433 MHz signals or any other long range wavelength transceivers (e.g., XBee, ZigBee, etc.). Other exemplary embodiments may use signals of any other suitable frequencies or wavelengths.

For instance, one exemplary embodiment may be configured to upload data to a local WIFI storage or to another local system that has both WIFI and cellular capabilities or just cellular capabilities. In one exemplary embodiment, a system that has WIFI capabilities may be placed in electrical communication with a camera. For example, the camera may upload a picture or other data to the WIFI system. The WIFI system may then wake up another exemplary embodiment of a system that has at least cellular capabilities. In such an example, the WIFI system may then send the picture or other data to the system that at least has cellular capabilities, which may then transmit the picture or other data to a remote location (e.g., a website, a mobile phone, an e-mail, etc.) In an exemplary embodiment, multiple WIFI systems may be in communication with a single system that at least has cellular capabilities, which may enable a user to only receive a single cellular bill associated with the use of the single system.

Figure 2:
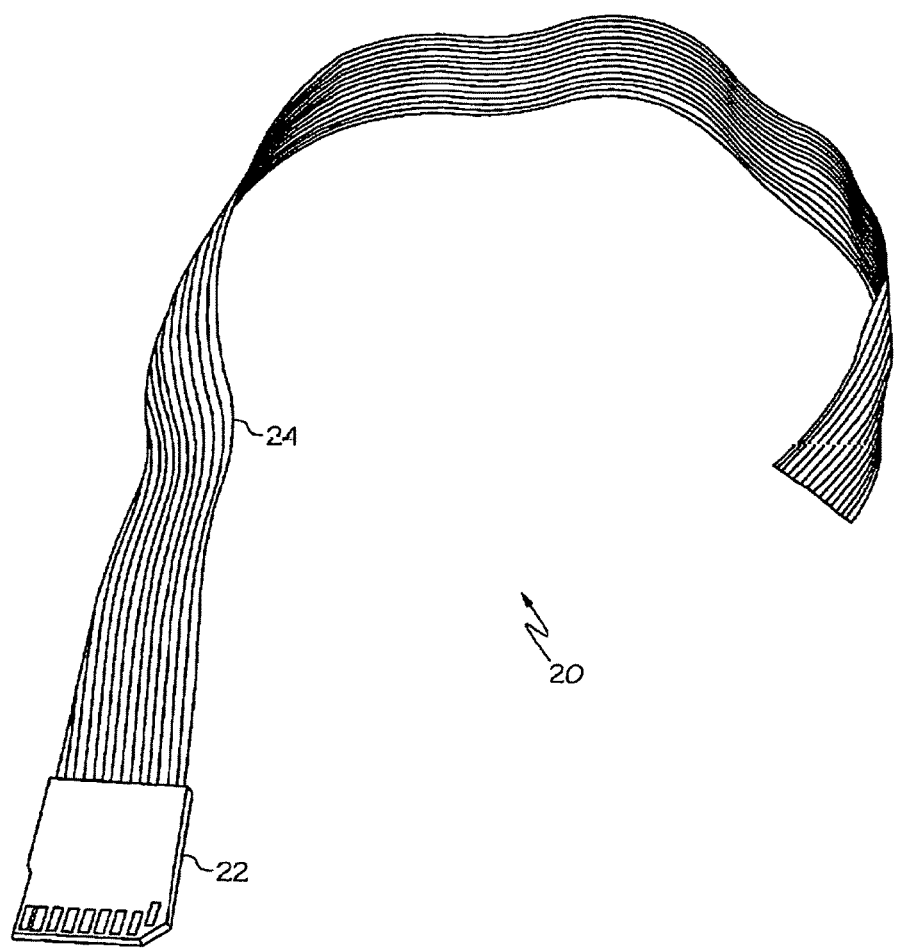
FIG. 2 is a perspective view of an exemplary embodiment of a media card connection cable of the present invention comprising a pseudo media card and a connection cable.

An exemplary embodiment of a media card connection cable 20 is shown in FIG. 2. In this example, media card connection cable 20 may comprise a pseudo media card 22 and a connection cable 24. This example of pseudo media card 22 is a media card shell (e.g., a SD shell) that has connection pads but may not have any internal memory or logic controllers. However, other exemplary embodiments may have other size/connection formats or some memory or logic controllers. In this instance, pseudo media card 22 may be inserted into a media card receptacle of the host device 100 in the same manner that a normal media card is inserted, but other exemplary embodiments may interface with a host device in any other suitable manner, as previously mentioned.

Connection cable 24 extends out of and is in electrical communication with pseudo media card 22. Connection cable 24 may be any suitable type of cable such as a ribbon cable, multi-wire cable, double-sided cable, etc. A thin flexible cable may be preferred since in many applications the cable may need to exit a host device in which there may be a door with a seal and latch to protect the media card slot of the host device. An example of connection cable 24 may be terminated by a connector end, a card end, or may wire directly into an electronics board. In an exemplary embodiment, a connector end or a card end may be preferred since replacement of the cable may eventually be necessary. However, some exemplary embodiments may instead terminate the connection cable 24 directly onto an electronics board. If no connector is used, a sealant may be recommended where connection cable 24 penetrates a shell or cover of the system in order to prevent the entry of water.

An example of a connector for connection cable 24 may be any number of styles of connector ends including, but not limited to, plug and socket, serial, 8P8C, D-subminiature, USB, RJ45, socket style, IDE, as well as other types of connectors. In such an embodiment, a connector end may be joined to a complementary connector. For example, a complementary connector may be attached to a device housing (i.e., a shell or cover) for the processing circuit 30 and may provide a pathway for data connection to processing circuit 30. In one preferred embodiment, a connector style may be used that minimizes penetration of water into system 10 such that, for example, corrosion of the pins does not occur or is significantly limited.

Figure 3:
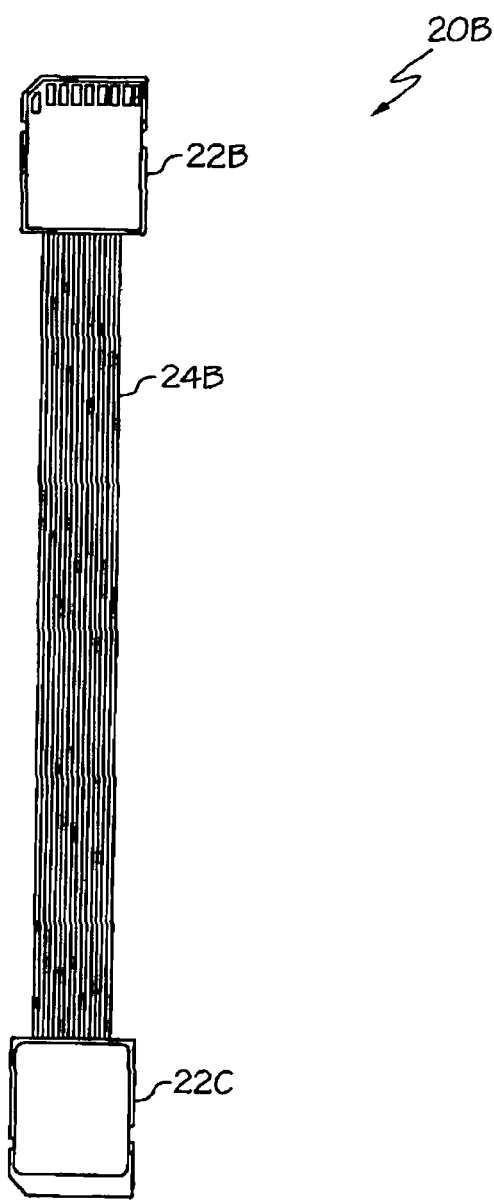
FIG. 3 is a side elevation view of another exemplary embodiment of a media card connection cable of the present invention comprising a double-sided SD card cable.

FIG. 3 shows another exemplary embodiment of a media card connection cable 20B that comprises a double-sided cable. In particular, this exemplary embodiment comprises pseudo SD media cards 22B and 22C, which are respectively located at opposite ends of a double-sided SD cable 24B. Such an embodiment may facilitate ease of connection to a host device and a processing circuit. As previously discussed, however, other exemplary embodiments may utilize other types or formats of storage devices in association with other suitable types of double-sided cable.

As previously mentioned, this exemplary embodiment of processing circuit 30 comprises a media card socket 32, at least one switch 34, and at least one processor or other suitable computing device 36. These features will now be described in more detail.

An exemplary embodiment of media card socket 32 is configured to receive media card 40, which may be used by host device 100 to store data. In one exemplary embodiment, media card 40 in its normal (i.e., default) state is connected to (i.e., in electrical communication with) host device 100 by media card connection cable 20 and is disconnected from processing circuit 30. In such an embodiment, whenever processing circuit 30 requires use of media card 40, it may disconnect media card socket 32 from media card connection cable 20, and hence the host device 100, and connect (i.e., place in electrical communication) the media card socket 32 to processing circuit 30 by, for example, using at least one switch 34 that is connected to media card socket 32.

Figure 4:
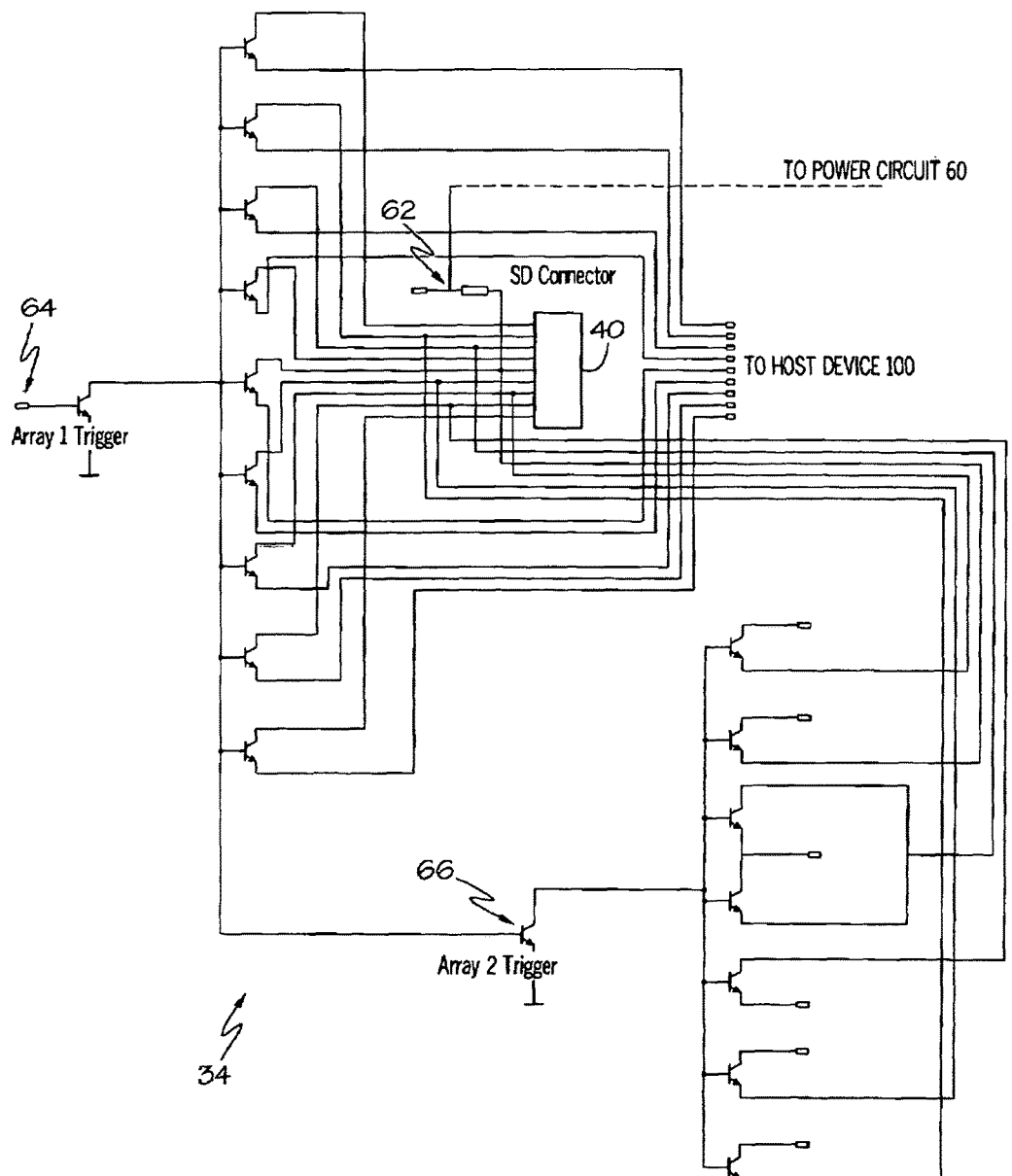
FIG. 4 is a schematic diagram of an exemplary embodiment of a processing circuit of the present invention comprising at least one transistor array that facilitates sharing of a media card between a host device and a processing circuit and is also adapted to provide a wakeup signal to a power circuit.

FIG. 4 shows one example of at least one switch 34 that is a transistor switch array. In particular, this embodiment of a transistor switch array may be comprised of at least two smaller arrays, namely array 1 and array 2 herein. In such an embodiment, array 1 allows connection of the media card 40 to host device 100, while array 2 allows connection of media card 40 to processing circuit 30. With array 1 and array 2 working together, this example of at least one switch 34 allows media card 40 to be shared between host device 100 and processing circuit 30. As previously mentioned, in an exemplary embodiment, host device 100 and processing circuit 30 are not allowed to read or write to or from media card 40 at the same time in order to facilitate the storage and transmission of data. However, in order to share the media card 40, processing circuit 30 is connected to media card 40 through transistors as shown in FIG. 4. In this embodiment, a power conductor of media card 40 is connected to power circuit 60 so that when media card 40 has voltage applied to it from host device 100, a power circuit wakeup signal 62 is sent to power circuit 60 and turns on power circuit 60 as explained in further detail below. For example, processing circuit 30 may be configured to monitor the power circuit wakeup signal 62 so that processing circuit 30 knows when host device 100 is accessing media card 40 to store data and therefore may wait until power circuit wakeup signal 62 shows no voltage before attempting to access media card 40. In such an embodiment, once power circuit wakeup signal 62 has no voltage, processing circuit 30 may activate an array 1 trigger 64 so that media card 40 is disconnected from host device 100. At or about the same time, array 1 trigger 64 may be configured to activate array 2 trigger 66, which may connect processing circuit 30 to media card 40.

In other exemplary embodiments, at least one switch 34 may implement any other suitable mechanism (e.g., MOSFETs, bus switches, digital switches, integrated circuit switches, microprocessors, etc.) to facilitate the switching of the use of media card 40. For example, another embodiment of at least one switch 34 may comprise at least one bus switch (and/or MOSFET, digital switch, integrated circuit switch, etc.) in lieu of or in combination with at least one transistor or transistor array to facilitate the switching of the use of media card 40. For instance, in one embodiment, at least one bus switch may be associated with at least one non-inverting demultiplexer in order to enable the switching of the media card. For another example, at least one transistor array may be combined or replaced with at least one microprocessor or similar computing device that comprises logic to control the connection and disconnection of media card 40 to and from host device 100 and processing circuit 30.

An exemplary embodiment of processing circuit 30 may comprise a single board computer (i.e., SBC). An example of a SBC may comprise multiple IC's (i.e., integrated circuits) or SoC's (system on a chip) to control the processing of data. In an exemplary embodiment, a SBC may be specifically designed for an application. However, in other exemplary embodiments, predesigned SBC's including, but not limited to, a beagleboard or a Raspberry Pi may be used to efficiently make prototypes or end user devices. Once media card 40 is connected to processing circuit 30, processing circuit 30 may be configured to read any files or other data located on media card 40. Processing circuit 30 may connect to media card 40 in a wide variety of suitable ways including, but not limited to, SPI mode and SD mode. In one embodiment, if media card 40 is a SD card, then processing circuit 30 may connect to the SD card using SPI mode. In an exemplary embodiment, processing circuit 30 may be configured to search for files in a directory called, for example, DCIM. Processing circuit 30 may then read each file (or other data) and if it is a picture file, for example, that has a file extension of JPEG, JPG, BMP, PNG, etc., processing circuit 30 may convert the picture file to a size set up by a user with an interface GUI. Once processing circuit 30 has read any files or other data on media card 40, processing circuit 30 may initiate a transmission sequence using at least one wireless source 50.

An example of a transmission sequence allows for the transmission of the files or other data from media card 40 to at least one external digital location. An exemplary embodiment of at least one wireless source 50 may comprise at least one wireless transceiver, wireless transmitter, or other suitable antenna devices. For example, a wireless transceiver may include a cellular transceiver (such as a USB modem), a Wi-Fi transceiver (such as a Wi-Fi USB dongle), or any other wireless transceiver (including xBee, Bluetooth, sub 1000 MHz transceivers, etc.). As a result, an exemplary embodiment of at least one wireless source 50 may, for example, be associated with a cellular or web network to transmit the files or other data to at least one remote external location. In particular, as described above, an exemplary transmission sequence may transfer the digital files or other data to the external digital location(s) that may be specified using an interface GUI.

If transmitting to a network location or an e-mail address, mobile phone, etc., an example of the transmission sequence may copy the file or other data to the network location or send the file or other data to the e-mail address, mobile phone, etc. For instance, once the file or other data has been copied to the network location or sent to the e-mail address, mobile phone, etc., the transmission sequence may look to the processing circuit 30 to see if the original file should be deleted off of media card 40, sent to another location, etc. If the file or other data is to be deleted, then the transmission sequence deletes it. On the other hand, if the file or other data is to remain on media card 40, then an exemplary embodiment of the transmission sequence may be configured to copy or otherwise transfer the file or other data to another subfolder (e.g., a SENT_FILES folder) and optionally delete the file or other data from an original directory within the media card that had contained the files or other data. In an exemplary embodiment, after the file or other data has been transmitted and the original file either moved or deleted, the transmission sequence may send a signal to power circuit 60 directing it to turn off to conserve power, and may also initiate a shutdown sequence for processing circuit 30.

An exemplary embodiment of system 10 may be configured to transmit the files or other data to any desired remote location. For example, an external digital location to which the digital files are to be transferred may be a network attached storage (i.e., NAS) device, a location on the internet or intranet, a mobile phone number, an e-mail address, or any other kind of digital location.

Additionally, without losing data, exemplary embodiments may be adapted to adjust to any disruption in the transfer of data to media card 40 and/or to interrupt a transfer of data to or from media card 40. In such events, the storage of any remaining data to media card 40 may occur at a later time when processing circuit 30 is not accessing media card 40 for a transmission sequence. An exemplary embodiment may also be adapted to adjust to any disruption in the transmission of data to an external location. For example, without losing any data, an exemplary embodiment may be adapted to retry the wireless transmission of data at a later time (e.g., at the next power up of the system).

An exemplary embodiment of power circuit 60, which comprises at least one battery and/or other power source (e.g., USB power) 68, may be configured to supply the necessary power for processing circuit 30. An example of power circuit 60 may utilize a latch (e.g., a MOSFET) or any other suitable mechanism to substantially continuously provide power to processing circuit 30, while also allowing processing circuit 30 to turn off power circuit 60 to conserve power. Since battery life is extremely important in many applications, an exemplary embodiment of processing circuit 30 may turn off after it is done transmitting any data, unless processing circuit 30 is in setup mode. Furthermore, an example of a latch may allow processing circuit 30 to turn off power circuit 60. In an example of operation, power circuit 60 may be turned on whenever host device 100 accesses media card 40 to store data. In particular, power circuit 60 may be connected to a supply voltage of media card 40 that is associated with access by host device 100. Therefore, whenever host device 100 accesses media card 40 to store data, power circuit 60 may latch on until processing circuit 30 de-latches it (e.g., after host device 100 has completed the transfer of data to media card 40).

Figure 5:
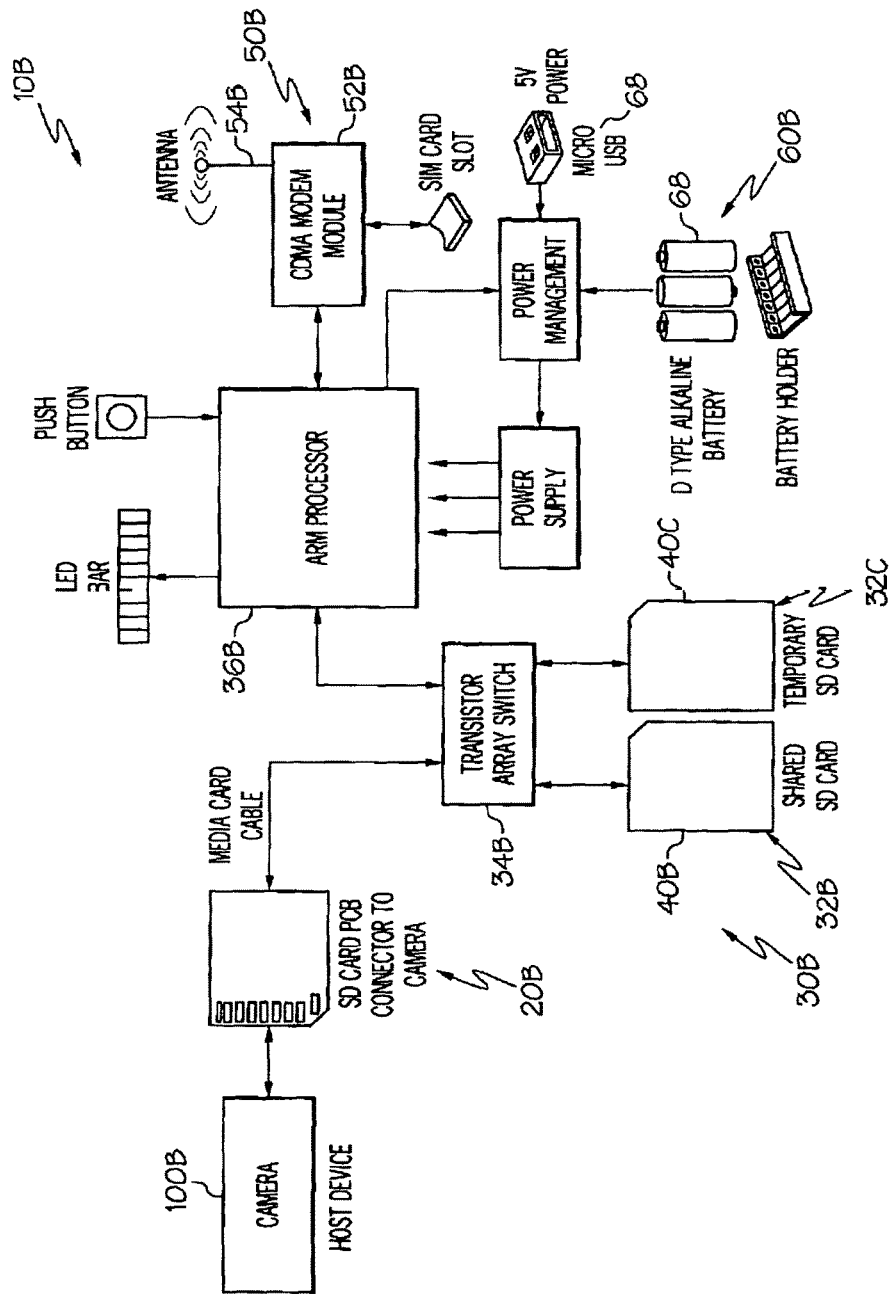
FIG. 5 is a schematic diagram of a second exemplary embodiment of a system of the present invention.

FIG. 5 illustrates another exemplary embodiment of a system of the present invention. This exemplary embodiment of system 10B may be substantially similar to system 10 of FIG. 1, both in structure and operation. Accordingly, the features of system 10B will be identified with the same numbers with accompanying letter designations. In particular, system 10B is similarly configured for transmitting data from a host device 100B (e.g., a digital camera) to an external location. System 10B may also comprise a media card connection cable 20B that is adapted to be connected to host device 100B. This exemplary system may also include a processing circuit 30B, at least one switch 34B (e.g., transistors, MOSFETs, bus switches, digital switches, integrated circuit switches, microprocessors, etc.), and at least one microprocessor or similar computing device 36B (e.g., microcontrollers, an Advanced RISC Machine (ARM) processor, etc.). Additionally, at least one wireless source 50B (e.g., a Code Division Multiple Access (CDMA) wireless module 52B that comprises antenna 54B) is in electrical communication with the processing circuit 30B such that the at least one wireless source 50B is configured to transmit data. In addition, a power circuit 60B may provide power to system 10B.

The primary distinction from system 10 is that system 10B comprises multiple media cards (and associated sockets/receptacles) for storing data that may be received from host device 100B. Specifically, system 10B comprises a first media card 40B, which is positioned in a first media card socket or receptacle 32B, and a second media card 40C, which is positioned in a second media card socket or receptacle 32C. As a result, media cards 40B and 40C are adapted to store data or other files that may be received from host device 100B. In particular, in an exemplary embodiment, system 10B may be configured such that processing circuit 30B and host device 100B alternate their access to each media card 40B, 40C.

Other exemplary embodiments may comprise additional media cards and associated sockets or receptacles. Furthermore, as with the example of system 10, other exemplary embodiments may utilize other suitable types of storage, and the system may include other suitable means of connection to such other storage devices. For ease of reference, any such other storage devices are again referred to as media cards herein.

In one exemplary embodiment of system 10B, a default position may be that first media card 40B (e.g., which may be referred to as a shared SD card) is connected to (i.e., in electrical communication with) host device 100B, and that second media card 40C (e.g., which may be referred to as a temporary SD card) is connected to (i.e., in electrical communication with) processing circuit 30B. On completion of a data transfer to first media card 40B, an exemplary embodiment of at least one switch 34B (e.g., transistors, MOSFETs, bus switches, digital switches, integrated circuit switches, microprocessors, etc.) may be configured to switch the interface such that first media card 40B is in electrical communication with processing circuit 30B and second media card 40C is in electrical communication with host device 100B. Processing circuit 30B may then be configured to read and initiate the transmission of data using at least one wireless source 50B, and host device 100B may store new data on second media card 40C. After a valid write of new data on second media card 40C, at least one switch 34B may again switch the interface such that the new data is transmitted by at least one wireless source 50B, and first media card 40B is back in electrical communication with host device 100B. Such as in this manner, an exemplary embodiment of system 10B may be configured to alternate the access of processing circuit 30B and host device 100B to each media card 40B, 40C.

An exemplary embodiment of system 10B may also be adapted to adjust to any disruption in the transfer of data to a media card and/or in the transmission of data to an external location. An exemplary embodiment may also be adapted to interrupt a transfer of data to a media card and/or a transmission of data to an external location. For instance, without losing any data, an exemplary embodiment may be adapted to retry the storage and/or wireless transmission of data at a later time, with or without an intervening switch of the interface to the media cards.

Figure 6:
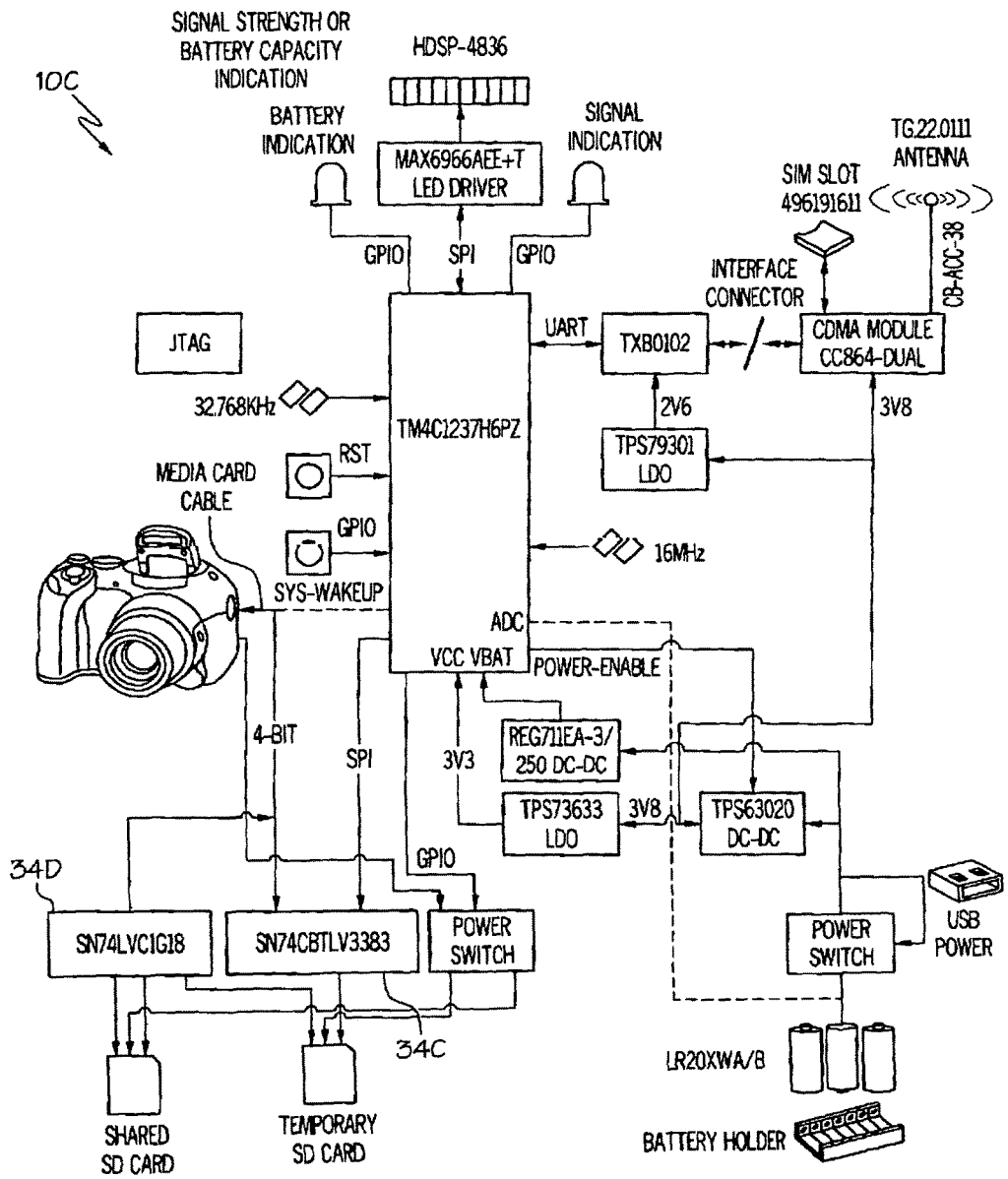
FIG. 6 is a schematic diagram of a third exemplary embodiment of a system of the present invention.
Figure 7:
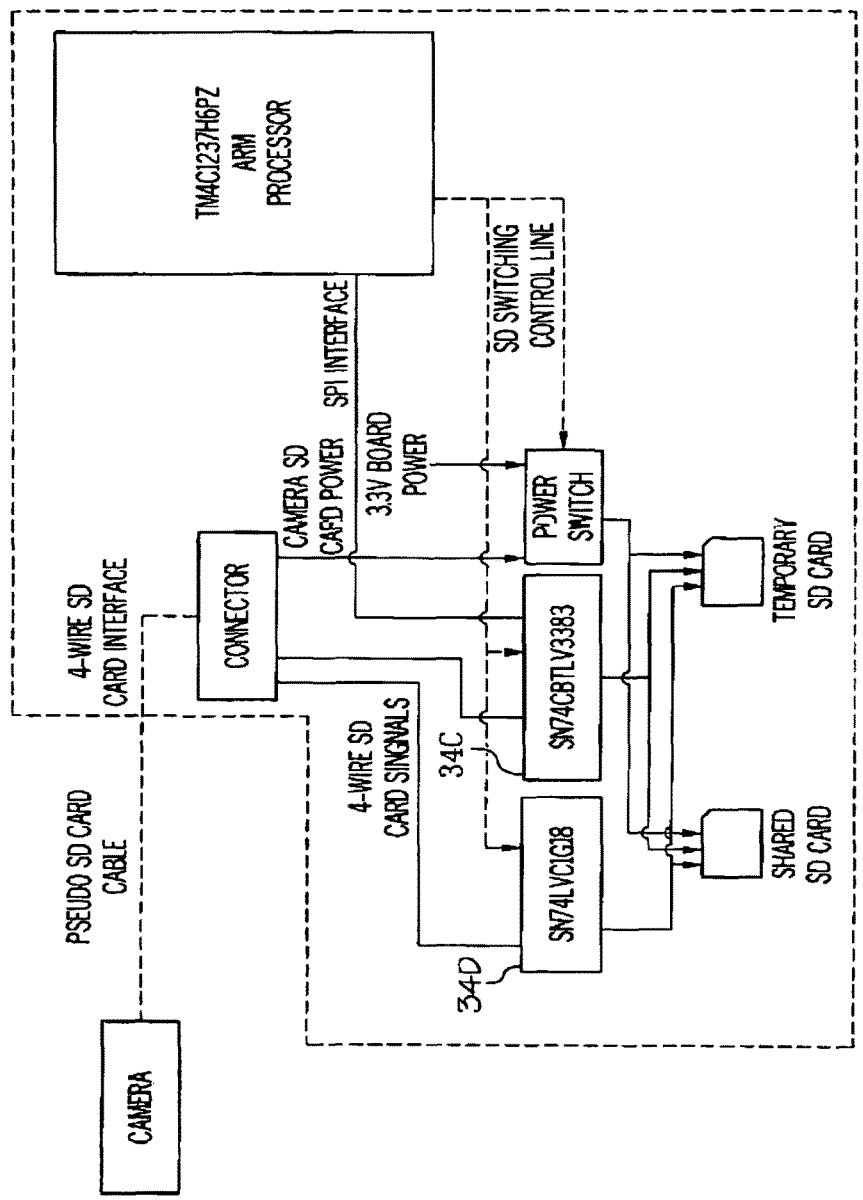
FIG. 7 is a schematic diagram that shows an example of the signals to and from the at least one switch of the system shown in FIG. 6.

FIG. 6 shows an example of a system 10C that also comprises multiple media cards. This embodiment may be similar to the embodiment of system 10B, both in structure and operation. In this embodiment, system 10C utilizes a bus switch 34C in association with a non-inverting demultiplexer 34D to facilitate switching of the use of each media card between a processing circuit and a host device. FIG. 7 shows a detailed view of the signals to and from bus switch 34C and non-inverting demultiplexer 34D. An example of bus switch 34C is identified in FIGS. 6 and 7 as part no. SN74CBTLV3383, which is commercially available from Texas Instruments, and an example of non-inverting demultiplexer 34D is identified as part no. SN74LVC1G18, which is also commercially available from Texas Instruments. Additionally, FIGS. 6 and 7 identify part no. TM4C1237H6PZ as an example of an ARM processor, which is commercially available from Texas Instruments. Other exemplary embodiments may utilize other types of bus switches, non-inverting demultiplexers, and processors to enable the switching between multiple media cards.

Figure 8:
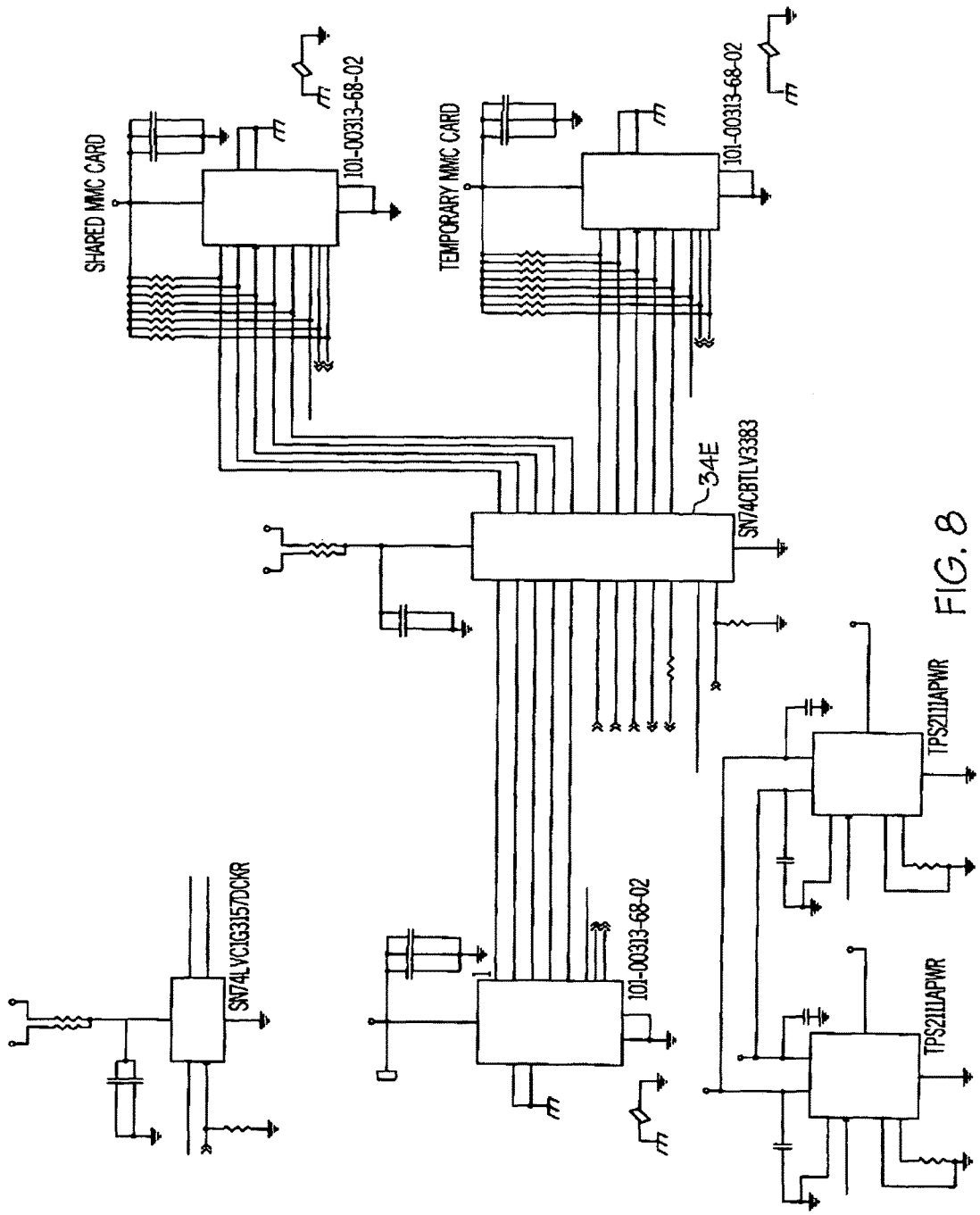
FIG. 8 is a circuit diagram of an exemplary embodiment of a portion of a processing circuit that comprises a bus switch for facilitating the switching of multiple media cards.

FIG. 8 illustrates another exemplary embodiment of at least one switch to facilitate switching of the use of multiple media cards between a host device and a processing circuit. Similar to the previous embodiment, this example also utilizes a bus switch 34E, namely part no. SN74CBTLV3383, which is commercially available from Texas Instruments. Again, other exemplary embodiments may implement another type of switch to enable switching of the media cards.

Furthermore, other exemplary embodiments may implement another suitable method and mechanism for alternating access to the media cards. For example, after transmission of data from a first media card, a system may be configured to switch the interface if no new data has been stored on a second media card. In such a configuration, the first media card may then again store data that is received from a host device. Other variations may be possible.

Figure 9:
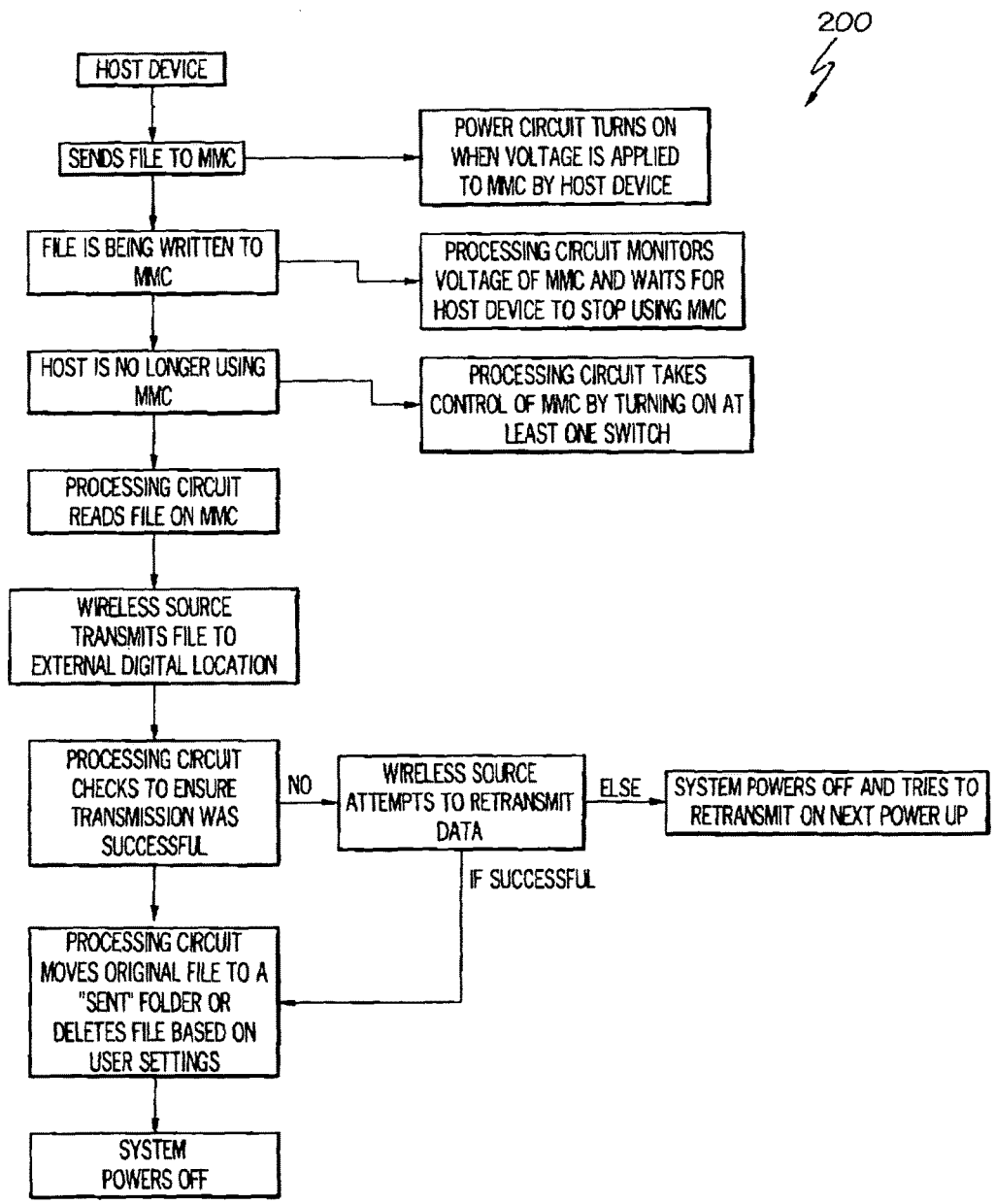
FIG. 9 is a flow chart of an exemplary embodiment of a process of the present invention for writing a file to a media card and then reading and transmitting that file to an external digital location.

FIG. 9 is a flow diagram of an exemplary process 200 of the present invention that utilizes a MMC for storage of data. In this example, when the host device sends data to the MMC, voltage is applied to the MMC, which in turn activates a power circuit. As the file or other data is written to the MMC, a processing circuit monitors the voltage applied to the MMC and waits for the host device to stop using the MMC. When the host device is no longer accessing the MMC, the processing circuit activates at least one switch (e.g., transistors, MOSFETs, bus switches, digital switches, integrated circuit switches, microprocessors, etc.) in order to take control of the MMC. The processing circuit reads the file or other data that is stored on the MMC and communicates with at least one wireless source to initiate the transmission of the file or other data to at least one external location. The processing circuit monitors the transmission of data by the at least one wireless source. If the transmission is not successful, the at least one wireless source may attempt to retransmit the data. Once the transmission is successful, the processing circuit may move the data on the media card from its original file to a "SENT" folder, or the processing circuit may be configured to simply delete the data that has already been successfully transmitted by the at least one wireless source. Such options may be determined by a user with a GUI, such as during the setup of the system. The system may then power off until the host device stores more data on the media card. On the other hand, if the transmission is not successful on the retry, the system may attempt to again retransmit the data at a later time (e.g., the system may power off and then later attempt to retransmit the data on or after the next power up of the system).

The foregoing process may be modified as set forth above, such as for a system that comprises multiple media cards. For example, the system may be configured to alternate the access of the processing circuit and host device to each media card. Any number of media cards and wireless sources may be used.

Other variations of the above-described systems and processes are possible. For instance, one exemplary embodiment of a system may include a push button in lieu of or in addition to the above-described setup button and/or broadcast button. For example, an embodiment of a device may include a push button that may be used to display the signal strength and/or the battery life. Examples of a display may be at any suitable location including, but not limited to, on the device itself, on a remote display (e.g., a website), etc. Alternatively, an exemplary embodiment of a push button may be adapted to cause a transmission of another type of signal (e.g., an alert) to a remote location (e.g., a mobile phone, an e-mail address, a website, etc.) regarding the signal strength and/or the battery life.

Other exemplary embodiments may include other suitable means to setup a system and may or may not include the above-described setup mode. For instance, other exemplary embodiments of a system may implement a website to facilitate setup. In one exemplary embodiment, a system may be pre-programmed with a basic setup in the internal memory or may not include any pre-programming. In such embodiments, a user of the system may use a website to program the settings for the system (e.g., by inputting the device serial # or other identifier on the website and then inputting the desired settings). Thereafter, for example, the next time the system communicates with the website, the system may be configured to check for and download the new settings. In an exemplary embodiment, a system may be manually actuated or automatically configured (e.g., at every startup, once a day, once a month, etc.) to check for and download new settings. In such an embodiment, a user may use the aforementioned website at any time to create new settings or to change the settings.

Other exemplary embodiments may not include the aforementioned broadcast button and/or the associated "wake up" feature. For instance, an exemplary embodiment of a system that is configured to upload data directly to a website or other remote location may not need a wake up signal. For example, an exemplary embodiment of a system that has cellular capabilities (with or without WIFI capabilities) may not need a signal to wake up another system to store or further transmit the data. Other variations may be possible.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for transmitting data from a host device to an external location, said system comprising:
   a media card connection cable adapted to be connected to a host device;
   a processing circuit comprising a media card socket;
   a media card positioned in said media card socket, said media card adapted to store data; and
   at least one wireless source in electrical communication with said processing circuit, said at least one wireless source configured to transmit data that is stored on said media card;
   wherein; in a first state, said media card is configured to store data transmitted by said host device through said media card connection cable;
   wherein, in a second state, said processing circuit is configured to disconnect said media card from electrical communication with said host device such that said at least one wireless source is enabled to transmit data that is stored on said media card; and
   wherein said media card connection cable comprises:
      (i) a pseudo media card that is configured to be inserted in a media card receptacle of said host device; and
      (ii) a connection cable in electrical communication with said pseudo media card and said processing circuit such that said media card connection cable is adapted to facilitate transmission of data from said host device to said media card in said first state of said system.

2. The system of claim 1 wherein said connection cable is selected from a group consisting of ribbon cables and multi-wire cables.

3. The system of claim 1 wherein said processing circuit further comprises at least one computing device that is adapted to provide instructions to said at least one wireless source as to where to transmit data in said second state of said system.

4. The system of claim 1 wherein said processing circuit comprises at least one transistor array that, in said first state, is configured to enable electrical communication between said media card and said host device and that, in said second state, is configured to enable electrical communication between said media card and said processing circuit.

5. The system of claim 1 wherein said processing circuit comprises at least one bus switch that, in said first state, is configured to enable electrical communication between said media card and said host device and that, in said second state, is configured to enable electrical communication between said media card and said processing circuit.

6. The system of claim 1 wherein said processing circuit is configured to disconnect said media card from electrical communication with said host device when said host device is not transmitting data to said media card.

7. The system of claim 1 wherein said system is configured such that said processing circuit and said host device are not allowed to read or write to or from said media card at the same time.

8. The system of claim 1 wherein said media card is selected from a group consisting of Secure Digital (SD) cards, Multi Media Cards (MMC), Compact Flash (CF) I and II cards, Memory Sticks (MS), and xD Picture (xD) cards.

9. The system of claim 1 wherein said at least one wireless source is selected from a group consisting of wireless transceivers and wireless transmitters.

10. The system of claim 1 wherein said at least one wireless source is associated with a cellular network.

11. A system for transmitting data from a host device to an external location, said system comprising:
   a media card connection cable adapted to be connected to a host device;
   a processing circuit comprising a first media card socket and a second media card socket;
   a first media card positioned in said first media card socket, said first media card adapted to store data;
   a second media card positioned in said second media card socket, said second media card adapted to store data; and at least one wireless source in electrical communication with said processing circuit, said at least one wireless source configured to transmit data that is stored on said first media card, in a first state of said system, and data that is stored on said second media card, in a second state of said system;

wherein, in said first state, said first media card is in electrical communication with said processing circuit, and said second media card is configured to store data transmitted by said host device through said media card connection cable;

wherein, in said second state, said second media card is in electrical communication with said processing circuit, and said first media card is configured to store data transmitted by said host device through said media card connection cable; and wherein said media card connection cable comprises:
(i) a pseudo media card that is configured to be inserted in a media card receptacle of said host device; and
(ii) a connection cable in electrical communication with said pseudo media card and said processing circuit such that said media card connection cable is adapted to facilitate transmission of data from said host device to said first media card in said second state of said system and to said second media card in said first state of said system.

12. The system of claim 11 wherein said connection cable is selected from a group consisting of ribbon cables and multi-wire cables.

13. The system of claim 11 wherein said processing circuit further comprises at least one computing device that is adapted to provide instructions to said at least one wireless source as to where to transmit data.

14. The system of claim 11 wherein said processing circuit comprises at least one transistor array that, in said first state, is configured to enable electrical communication between said first media card and said processing circuit and between said second media card and said host device and that, in said second state, is configured to enable electrical communication between said second media card and said processing circuit and between said first media card and said host device.

15. The system of claim 11 wherein said processing circuit comprises at least one bus switch that, in said first state, is configured to enable electrical communication between said first media card and said processing circuit and between said second media card and said host device and that, in said second state, is configured to enable electrical communication between said second media card and said processing circuit and between said first media card and said host device.

16. The system of claim 11 wherein:
said processing circuit is configured to disconnect said first media card from electrical communication with said host device when said host device is not transmitting data to said first media card; and
said processing circuit is configured to disconnect said second media card from electrical communication with said host device when said host device is not transmitting data to said second media card.

17. The system of claim 11 wherein said system is configured such that said processing circuit and said host device are not allowed to read or write to or from said first media card at the same time or to or from said second media card at the same time.

18. The system of claim 11 wherein each of said media cards is selected from a group consisting of Secure Digital (SD) cards, Multi Media Cards (MMC), Compact Flash (CF) I and II cards, Memory Sticks (MS), and xD Picture (xD) cards.

19. The system of claim 11 wherein said at least one wireless source is selected from a group consisting of wireless transceivers and wireless transmitters.

20. The system of claim 11 wherein said at least one wireless source is associated with a cellular network.

21. A system for transmitting data from a host device to an external location, said system comprising:
a media card connection cable adapted to be connected to a host device;
a processing circuit comprising a media card socket;
a media card positioned in said media card socket, said media card adapted to store data; and
at least one wireless source in electrical communication with said processing circuit, said at least one wireless source configured to transmit data that is stored on said media card;
wherein, in a first state, said media card is configured to store data transmitted by said host device through said media card connection cable;
wherein, in a second state, said processing circuit is configured to disconnect said media card from electrical communication with said host device such that said at least one wireless source is enabled to transmit data that is stored on said media card; and
wherein said processing circuit comprises at least one transistor array that, in said first state, is configured to enable electrical communication between said media card and said host device and that, in said second state, is configured to enable electrical communication between said media card and said processing circuit.

22. A system for transmitting data from a host device to an external location, said system comprising:
a media card connection cable adapted to be connected to a host device;
a processing circuit comprising a media card socket;
a media card positioned in said media card socket, said media card adapted to store data; and
at least one wireless source in electrical communication with said processing circuit, said at least one wireless source configured to transmit data that is stored on said media card;
wherein, in a first state, said media card is configured to store data transmitted by said host device through said media card connection cable;
wherein, in a second state, said processing circuit is configured to disconnect said media card from electrical communication with said host device such that said at least one wireless source is enabled to transmit data that is stored on said media card; and
wherein said processing circuit comprises at least one bus switch that, in said first state, is configured to enable electrical communication between said media card and said host device and that, in said second state, is configured to enable electrical communication between said media card and said processing circuit.

23. A system for transmitting data from a host device to an external location, said system comprising:
a media card connection cable adapted to be connected to a host device;
a processing circuit comprising a first media card socket and a second media card socket;
a first media card positioned in said first media card socket, said first media card adapted to store data;

a second media card positioned in said second media card socket, said second media card adapted to store data; and at least one wireless source in electrical communication with said processing circuit, said at least one wireless source configured to transmit data that is stored on said first media card, in a first state of said system, and data that is stored on said second media card, in a second state of said system;

wherein, in said first state, said first media card is in electrical communication with said processing circuit, and said second media card is configured to store data transmitted by said host device through said media card connection cable;

wherein, in said second state, said second media card is in electrical communication with said processing circuit, and said first media card is configured to store data transmitted by said host device through said media card connection cable; and wherein said processing circuit comprises at least one transistor array that, in said first state, is configured to enable electrical communication between said first media card and said processing circuit and between said second media card and said host device and that, in said second state, is configured to enable electrical communication between said second media card and said processing circuit and between said first media card and said host device.

24. A system for transmitting data from a host device to an external location, said system comprising:

a media card connection cable adapted to be connected to a host device;

a processing circuit comprising a first media card socket and a second media card socket;

a first media card positioned in said first media card socket, said first media card adapted to store data;

a second media card positioned in said second media card socket, said second media card adapted to store data; and at least one wireless source in electrical communication with said processing circuit, said at least one wireless source configured to transmit data that is stored on said first media card, in a first state of said system, and data that is stored on said second media card, in a second state of said system;

wherein, in said first state, said first media card is in electrical communication with said processing circuit, and said second media card is configured to store data transmitted by said host device through said media card connection cable;

wherein, in said second state, said second media card is in electrical communication with said processing circuit, and said first media card is configured to store data transmitted by said host device through said media card connection cable; and wherein said processing circuit comprises at least one bus switch that, in said first state, is configured to enable electrical communication between said first media card and said processing circuit and between said second media card and said host device and that, in said second state, is configured to enable electrical communication between said second media card and said processing circuit and between said first media card and said host device.

* * * * *